United States Patent [19]
Chen

[11] Patent Number: 5,477,628
[45] Date of Patent: Dec. 26, 1995

[54] PICTURE FRAME ASSEMBLY

[76] Inventor: Fay L. Chen, 3942 Aspen, Irvine, Calif. 92714

[21] Appl. No.: 286,933

[22] Filed: Aug. 8, 1994

[51] Int. Cl.⁶ ........................................ G09F 1/12
[52] U.S. Cl. .................. 40/155; 40/152; 403/403
[58] Field of Search ....................... 40/152, 152.1, 40/155, 156; 403/401, 403

[56]  References Cited

U.S. PATENT DOCUMENTS

| | | | |
|---|---|---|---|
| 1,558,987 | 10/1925 | Kallscheuer | 40/155 |
| 3,266,361 | 8/1966 | Gravenhorst et al. | |
| 3,425,721 | 2/1969 | Agee. | |
| 4,136,470 | 1/1979 | Barz | 40/152 |
| 4,428,135 | 1/1984 | Sobel. | |
| 4,438,578 | 3/1984 | Logan. | |
| 4,477,990 | 10/1984 | Buchanan. | |
| 4,922,638 | 5/1990 | Litivak et al. | |

FOREIGN PATENT DOCUMENTS

| | | | |
|---|---|---|---|
| 1908501 | 9/1970 | Germany | 403/401 |
| 2231995 | 11/1990 | United Kingdom | 40/152 |

*Primary Examiner*—Brian K. Green
*Attorney, Agent, or Firm*—James G. O'Neill

[57]  ABSTRACT

A modular picture frame assembly having a plurality of corner assemblies secured to side frame assemblies to form a more secure and stable frame, and in which each of the side frame assemblies are constructed so as to be easily either permanently or temporarily adjusted in length to enable different size picture frames to be formed.

20 Claims, 2 Drawing Sheets

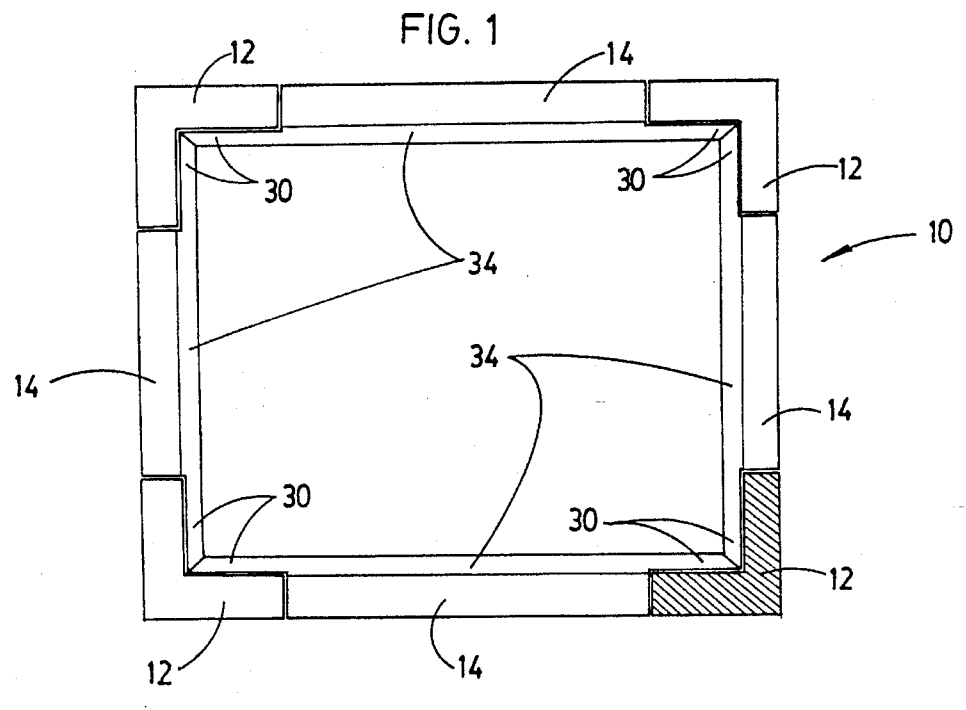
FIG. 1
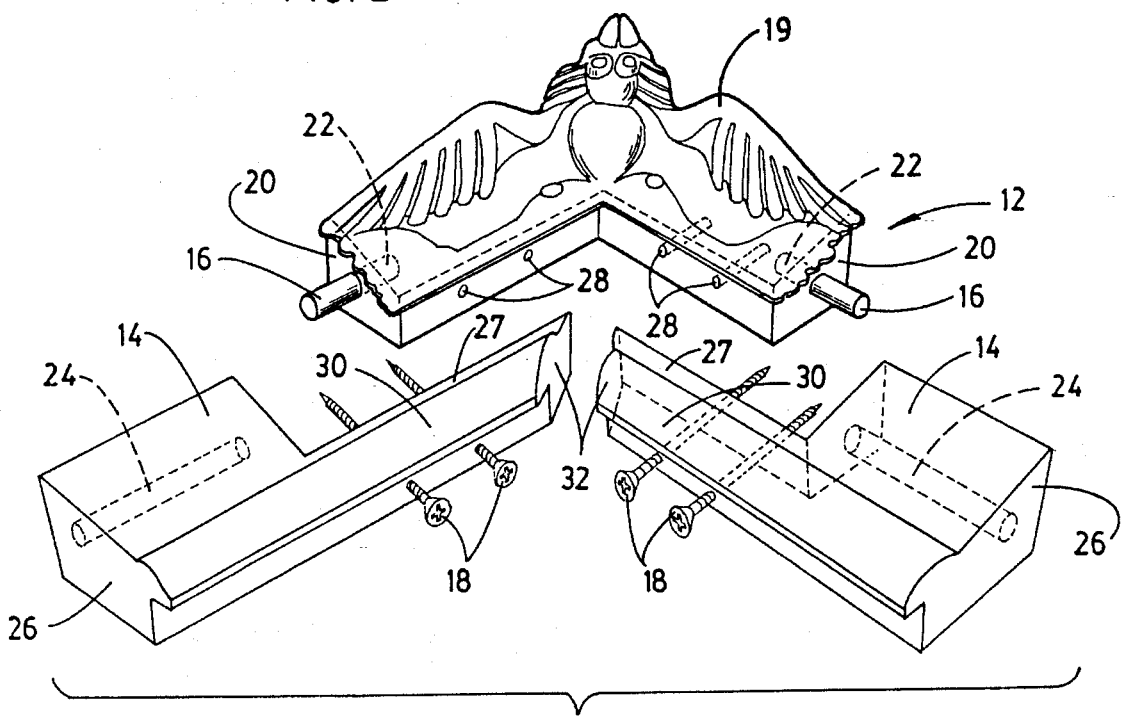
FIG. 2
FIG. 2

PICTURE FRAME ASSEMBLY

BACKGROUND OF THE INVENTION

1. Field of the Invention

This invention relates generally to modular picture frame assemblies, and more particularly to an improved picture frame assembly having corner and side frame members secured together in such a manner that a stronger frame is formed, and in which the side frame members may be easily adjusted to form different size picture frames.

2. Description of Related Art

U.S. Pat. No. 4,922,638 to Litvak et al. ("'638"), describes a decorative modular picture frame having corner brackets having extensions which fit into milled end portions of frame sections in an interlocking and interchangeable manner to form picture frames. However, although the '638 patent solves certain of the problems which occur in making and forming such picture frame assemblies, the need still exists for a simple, low-cost and easy to manufacture picture frame assembly, having means for allowing the corner and frame sections to be brought and held together in an even more expeditious and secure manner, and for allowing the length of the frame sections to be easily adjusted to frame different size pieces of art.

U.S. Pat. Nos. 3,266,361, 3,425,721, 4,428,135, 4,438,578 and 4,477,990 disclose specific features of constructing picture frames or joining mitered corners of wooden members, but also lack means for allowing the corner and frame sections to be brought and held together in an even more expeditious and secure manner, and for allowing the length of side frame sections to be easily adjusted to form frames for different size artwork.

SUMMARY OF THE INVENTION

Accordingly, it is a general object of the present invention to provide an improved modular picture frame assembly. It is a particular object of the present invention to provide an improved modular picture frame assembly which is easy to manufacture, assemble and change in size. It is a still more particular object of the present invention to provide an improved modular picture frame assembly having a plurality of corners which are easily inserted and held in place at the ends of elongated side frame members. It is yet another particular object of the present invention to provide an improved modular picture assembly which utilizes readily adjustable elongated side frame members. And it is still a further particular object of the present invention to provide elongated side frame members for a modular picture frame which contain nested, selected increment elements at both ends of inner and outer portions thereof.

In accordance with one aspect of the present invention, there is provided a modular picture frame assembly having a plurality of substantially solid corner assemblies inserted into and secured to adjustable side frame assemblies so as to form more secure and stable picture frames which are easily either permanently or temporarily adjusted in size to frame works of art.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 1 is a front elevational view of an assembled picture frame of the present invention;

FIG. 2 is an enlarged, partial exploded perspective view of one corner assembly of the frame of FIG. 1;

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to describe an improved picture frame assembly, identified generally at 10 in FIG. 1 of the drawings.

It is to be understood that the present invention is an improvement in and to picture frame assemblies, particularly for use in framing expensive and/or museum grade artwork in a simplified and less expensive manner.

Figure 3:
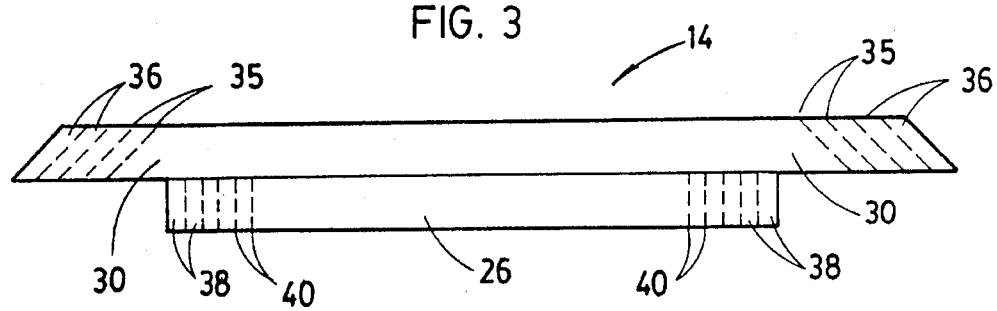
FIG. 3 is a front elevational view of an individual side frame member of the present invention.

FIG. 1 of the drawings illustrates an assembled picture frame 10, having four (4) separate corner assemblies or members 12 (shown in more detail in FIG. 2), securely inserted into and held or assembled to four (4) adjustable, elongated, side frame assemblies or members 14 (shown in more detail in FIGS. 2 and 3). Each corner assembly 12 is inserted and securely held to adjacent ends of a pair of elongated side frame members 14, by a plurality of securing means, such as dowel or pin means 16, and at least one, but preferably a plurality of fastening means, such as screws 18, all of which are shown in FIG. 2, and described in more detail below.

FIG. 2 most clearly shows the preferred construction of one of the corner assemblies 12, all 4 of which are substantially identical and interchangeable. Each of these corner assemblies are formed from any desired, or available material, as a single or unitary member having a pair of perpendicular legs. A decoration or other means 19 is preferably formed on or secured to the top surfaces of the leg portions, to form any desired design, or the like, on each interchangeable corner element. The means 19 on the top surface of each corner element 12 also preferably includes extending edges or lip portions surrounding the inner top surface edges of the corner section so as to overlap and hide the corresponding edges, such as 27, of the ends of a pair of elongated side frame members 14 to be joined by the corners, to form a more aesthetically pleasing frame, which looks as if it is substantially one uninterrupted piece.

Dowel means 16 are fixedly mounted or secured in openings 22 formed at each of the substantially perpendicular ends 20 of the legs of the 4 corner assemblies. When the frame 10 is assembled, the dowels 16 serve to guide the ends of the corner assemblies while being inserted into and secured in aligned openings 24 formed through enlarged central or main portions 26 of aligned pairs of elongated side frame members 14. Additionally, after each of the corner assemblies 12 is firmly secured to adjacent pairs of elongated side frame members 14 by the dowels 16, with the inner top surface edges of the corner sections overlapping and hiding the corresponding edges, such as 27, of the elongated frame sections, at least one, and preferably a plurality of securing means 18 are inserted through preformed openings passing through reduced size end portions 30 extending from the enlarged central portion 26 of the elongated side members 14. The securing means 18 are firmly secured in place in aligned, preformed openings 28 in the legs of the corner assemblies 12, so as to form a stronger more secure picture frame 10 having corners 12 which are secured to the elongated side frame members by a plurality of means, such as the dowels and screws 18.

As is also shown in FIGS. 1 and 2, the reduced size end portions 30 extending from the enlarged central portion 26 of each of the elongated side frame members 14 includes portions which extend both longitudinally along the length of the side frame members 14 and perpendicularly therefrom, and are preferably formed integrally with the main portions 26. The reduced size end portions 30 terminate in angled tips 32, preferably at 45 degrees, so that they accurately mate when the picture frame is assembled. These reduced size extending end portions 30 and their respective tips 32 also allow each of the elongated frame members 14 to be assembled and mated to the corners 12, to form a substantially unbroken inner covering edge 34 (see FIG. 1), which will totally surround any art held in the assembled frame 10, without any breaks therein (except where each adjacent end meets), to thereby form a more expensive or professional looking and aesthetically pleasing frame, than is presently available with known modular frames.

Each of the elongated side frame members 14 consists of the enlarged central and reduced size extending end portions 26, 30, and is preferably formed, from any desired or available material, as an integral unit which is easily adjustable to predetermined lengths, either permanently or temporarily. As shown in FIG. 3, the adjustment of each elongated side frame member 14 may be accomplished by taking off, as by sawing, preselected increments 36, 38 from each end of both the enlarged central and reduced size extending end portions 26, 30. For example, preselected increments to take-off could be marked by angled guide, perforated or scored lines 35 formed along the ends of the reduced size end portions 30 and an equal number of increments 38 also have to be cut-off, along substantially perpendicular lines 40 formed on enlarged central portion 26, at each end of each elongated side frame member 14. The number and size of each of the selected increments 36, 38 to be removed from the respective ends of the elongated side frame members should be identical, and, depending on the desired adjustability, could, for example, range from 2 or more in number, and be between ¼" to ½", or even more, in length. Additionally, the openings 24 should also be formed so as to be of sufficient depth to allow increments 38 to be removed, and a sufficient number of preformed openings for the screws 18 to pass through should be formed through each of the reduced size end portions 30, so as to always have a predetermined number of openings remaining for the securing means 18, after cutting off the desired number of increments.

Figure 4:
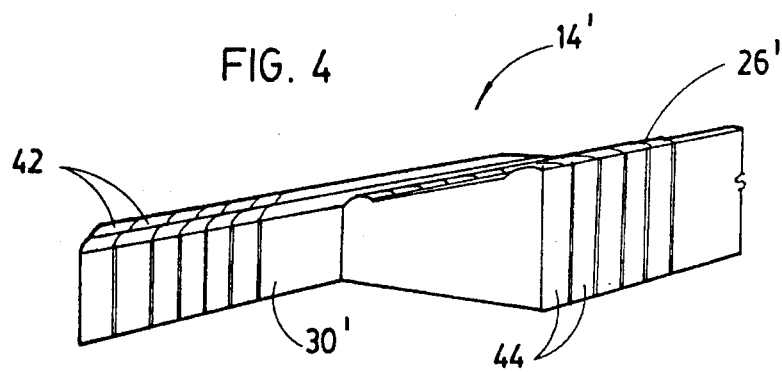
FIG. 4 is an enlarged, partial perspective view of one end of the side frame member of FIG. 3.
Figure 5:
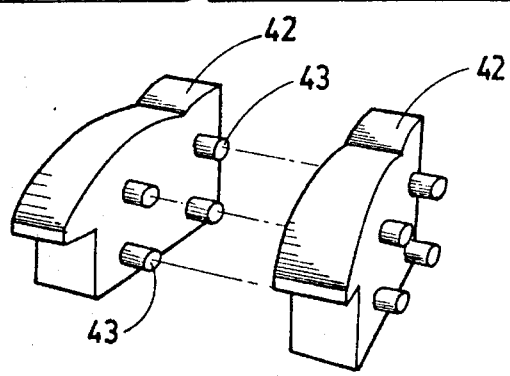
FIG. 5 is an enlarged, exploded perspective view of one embodiment of removable increment means for adjusting the length of a portion of the side frame member of FIG. 3.
Figure 6:
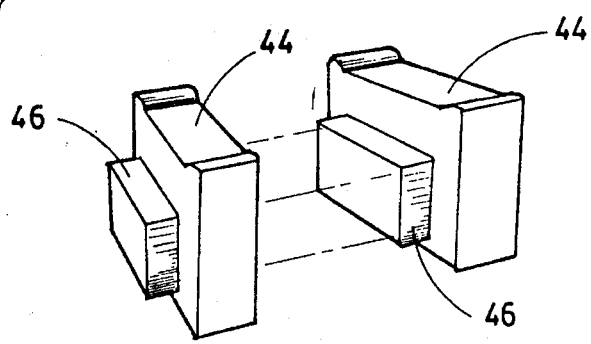
FIG. 6 is an enlarged, exploded perspective view of another embodiment of removable cap means for adjusting the length of a further portion of the side frame member of FIG. 3.

If it is desired to more easily adjust, or only temporarily adjust the length of the elongated side frame members, they may be formed as shown in FIGS. 4–6. That is, each end of an enlarged central and a reduced size extending end portion 26', 30', of an elongated side frame member 14' may be provided with a plurality of nested, selected increment elements 42, 44. Each of the nested, selected increment elements 42, 44 may be formed on the ends of either or both of the ends of the enlarged central and the tips of the reduced size extending end portions 26', 30'. In use, when it is desired to adjust the length of an elongated side member, a number of nested increment elements 42, 44 are added to or removed from each of the respective ends of the portions of an elongated side frame member. As shown in FIG. 5 or 6, and depending on the desired adjustability, each of the nested increment elements 42, 44, could, for example, range from 2 or more in number and be between ¼" to ½", or even more, in thickness. Each of the nested increment elements, such as 42, would be removably secured to the outer ends of the reduced size portions 30' and have securing means, such as a plurality of pins 43 on one side, which would be removably secured in an equal number of aligned holes (not shown) formed on the other side of a substantially identical increment element 42. Therefore, a plurality of such elements 42 may be nested and removably held together.

Additionally and/or alternatively, as shown in FIG. 6, each of the nested increment elements, such as 44 could be formed so as to have a single securing means, such as an extending block 46 on one side, which would be removably secured in a single aligned hole (not shown) formed on the other side of a substantially identical increment element 44 so that a plurality of such elements 44 may be nested and removably held together. Since these elements 44 are shown as being formed to the enlarged central portion 26' of 14', an opening (not shown), such as 24, of a selected size to receive and hold dowels 16 of the corner members 12 would also be required.

It, therefore, can be seen that the modular picture frame assembly of the present invention include unitary corner assemblies or means 12 which are quickly and easily assembled to elongated side frame members 14, by first inserting dowels held in the ends of legs of the corner members into aligned openings in the abutting ends of adjacent elongated side frame members and then inserting and securing screws into aligned openings formed through extending ends of both side frame members and the corner members, in such a manner that the corner and elongated side frame members of a completed picture frame are very securely held together by both dowels and screws. Furthermore, the assembled picture frame will have no unseemly joints, and will include a substantially unbroken inner covering edge 34, which will totally surround any art held in the assembled frame 10. Furthermore, the assembled picture frame may be easily adjusted in size by use of the permanent or adjustable features of the elongated side frame members.

It, thus, can be seen that the picture frame assembly of the present invention includes interchangeable corners which coact with elongated side frame members to form a picture frame that is both stronger and more aesthetically pleasing than known frames, and which may be easily adjusted in size to fit substantially any size artwork to be framed, by the removal of predetermined sized increment elements which are permanently or removably inserted and held in the ends of elongated side frame members.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What I claim is:

1. A modular picture frame assembly comprising, in combination:

four corner elements, each corner element being formed as a unitary member having a pair of perpendicular legs secured together at one end; each perpendicular leg having a second end and a top surface; a first opening formed in the second end of each of said perpendicular legs; a securing means held in each of the first openings;

four elongated side frame members removably secured to said four corner elements to form said modular picture frame assembly; each of the elongated side frame members having a central portion and two ends, with each of said two ends including first and second portions; each first portion extending away from the second portion and said central portion, and terminating in a tip;

said second portions of said two ends of each of said central portion of each of said elongated side frame members including a second opening; said second opening adapted to receive a securing means held in one of the first openings; and at least one further securing means passing through said first portion of each of said two ends of said side frame members and captured in a third opening formed in said perpendicular legs, for more securely holding each of said corner elements to adjacent elongated side frame members.

2. The modular picture frame assembly of claim 1 wherein each of said elongated side frame members includes adjusting means to enable each of said elongated side frame members to be adjustable in length so as to enable different size picture frames to be formed therefrom.

3. The modular picture frame assembly of claim 2 wherein said adjusting means for each of said elongated side frame members includes incremental elements mounted on the first and second portions of the two ends.

4. The modular picture frame assembly of claim 3 wherein said incremental elements must be cut-off along score lines formed on said first and second portions of said two ends of each of said elongated side frame members.

5. The modular picture frame assembly of claim 3 wherein said incremental elements are comprised of at least one nested incremental element removably secured on said two ends of each of said elongated side frame members.

6. The modular picture frame assembly of claim 5 wherein there are a plurality of nested incremental elements removably secured to each other and said two ends of each of said elongated side frame members.

7. The modular picture frame assembly of claim 1 wherein the top surfaces of said perpendicular legs of each of said corner elements includes an extending lip portion which overlaps and hides at least a part of the first portion of a pair of elongated side frame members joined thereto.

8. The modular picture frame assembly of claim 7 wherein each of said elongated side frame members includes adjusting means to enable each of said elongated side frame members to be adjustable in length so as to enable different size picture frames to be formed therefrom.

9. The modular picture frame assembly of claim 8 wherein said adjusting means for each of said elongated side frame members includes incremental elements mounted on the first and second portions of the two ends.

10. The modular picture frame assembly of claim 9 wherein said incremental elements must be cut-off along score lines formed on said first and second portions of said two ends of each of said elongated side frame members.

11. The modular picture frame assembly of claim 9 wherein said incremental elements are comprised of at least one nested incremental element removably secured on said two ends of each of said elongated side frame members.

12. The modular picture frame assembly of claim 11 wherein there are a plurality of said nested incremental elements removably secured to each other and said two ends of each of said elongated side frame members.

13. A modular picture frame assembly comprising, in combination:

four corner elements; each corner element being formed as a unitary member having a pair of perpendicular legs secured together at one end; said perpendicular legs having a second end and a top surface; a first opening formed in the second end of each of said perpendicular legs; a dowel means held in each of the first openings; the top surfaces of said perpendicular legs including extending lip portions;

four elongated side frame members removably secured to said four corner elements to form said modular picture frame assembly; each of the elongated side frame members having a central portion and two ends, with each of said two ends including first and second portions; each first portion extending away from the second portion and said central portion, and terminating in a tip having a 45 degree edge formed thereon;

said second portions of said two ends of each of said elongated side frame members including a second opening; said second opening receiving a dowel means held in one of the first openings formed in said second end of one of said perpendicular legs; and a plurality of securing means passing through said first portions of each of said two ends of said central portions and captured in a plurality of third openings formed in said perpendicular legs, for more securely holding each of the corner elements and elongated side frame members together, with said extending lip portions overlapping a pair of elongated side frame members joined to each of said corner elements.

14. The modular picture frame assembly of claim 13 wherein each of said elongated side frame members includes adjusting means to enable each of said elongated side frame members to be adjustable in length so as to enable different size picture frames to be formed therefrom.

15. The modular picture frame assembly of claim 14 wherein said adjusting means for each of said elongated side frame members includes incremental elements mounted on the first and second portions of the two ends.

16. The modular picture frame assembly of claim 15 wherein said incremental elements must be cut-off along score lines formed on said first and second portions of said two ends of each of said elongated side frame members.

17. The modular picture frame assembly of claim 15 wherein said incremental elements are comprised of at least one nested incremental element removably secured on said two ends of each of said elongated side frame members.

18. The modular picture frame assembly of claim 17 wherein there are a plurality of nested incremental elements removably secured to each other and said two ends of each of said elongated side frame members.

19. A modular picture frame assembly comprising, in combination:

four corner elements; each corner element being formed as a unitary member having a pair of perpendicular legs secured together at one end; said perpendicular legs having a second end and a top surface; a first opening formed in the second end of each of said perpendicular legs; a dowel means held in each of the first openings;

the top surfaces of said perpendicular legs including extending lip portions;

four adjustable, elongated side frame members removably secured to said four corner elements to form said modular frame assembly; each of the adjustable, elongated side frame members having a central portion and two ends, with each of the two ends including a first and second portion; each first portion extending away from the second portion and said central portion, and terminating in a tip having 45 a degree edge formed thereon; said first portions comprising both a longitudinal section extending completely along each of said elongated side frame members, and a perpendicular section, whereby, when said four corner elements and said four adjustable, elongated side frame members are secured together, a substantially unbroken inner covering edge will be formed for totally surrounding any art held in said modular picture frame assembly;

said second portions of said two ends of said elongated side frame members including a second opening therein, to receive a dowel means held in one of the first openings formed in said second end of one of said perpendicular legs; and a plurality of securing means insertable through openings formed through each of said first portions and captured in a plurality of third openings formed in said perpendicular legs of said corner elements, for more securely holding each of said corner elements and elongated side frame members together, with said extending lip portions overlapping corresponding edges of a pair of elongated side frame members joined to each of said corner elements.

20. The modular picture frame assembly of claim 19 wherein each of said adjustable, elongated side frame members include a plurality of incremental elements on said second portions of said two ends and on the tips of each of said first portions of said two ends, which plurality of incremental elements may be selectively taken away, one at a time, to form different length elongated side frame members.

\* \* \* \* \*